under 35 U.S.C. 154(b) by 551 days.

(12) United States Patent
Sahoo et al.

(10) Patent No.: US 7,392,433 B2
(45) Date of Patent: Jun. 24, 2008

(54) METHOD AND SYSTEM FOR DECIDING WHEN TO CHECKPOINT AN APPLICATION BASED ON RISK ANALYSIS

(75) Inventors: Ramendra K. Sahoo, Mohegan Lake, NY (US); Adam J. Oliner, Cheshire, CT (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 11/042,611

(22) Filed: Jan. 25, 2005

(65) Prior Publication Data

US 2006/0168473 A1 Jul. 27, 2006

(51) Int. Cl.
*G06F 11/00* (2006.01)
(52) U.S. Cl. .......................................... 714/38; 714/49
(58) Field of Classification Search ........................ None
See application file for complete search history.

(56) References Cited

U.S. PATENT DOCUMENTS

| 5,845,082 | A * | 12/1998 | Murakami | 709/226 |
| 6,467,054 | B1 * | 10/2002 | Lenny | 714/42 |
| 6,477,667 | B1 * | 11/2002 | Levi et al. | 714/57 |
| 6,854,069 | B2 * | 2/2005 | Kampe et al. | 714/4 |
| 7,246,229 | B2 * | 7/2007 | Suermondt et al. | 713/100 |
| 2003/0037288 | A1 * | 2/2003 | Harper et al. | 714/37 |
| 2006/0005063 | A1 * | 1/2006 | Patrick et al. | 714/1 |
| 2006/0010352 | A1 * | 1/2006 | Mukherjee et al. | 714/47 |
| 2006/0026009 | A1 * | 2/2006 | Luhr | 705/1 |
| 2006/0112314 | A1 * | 5/2006 | Soto | 714/38 |
| 2007/0088972 | A1 * | 4/2007 | Srivastava et al. | 714/4 |

* cited by examiner

*Primary Examiner*—Christopher S McCarthy
(74) *Attorney, Agent, or Firm*—Michael J. Buchenhorner; Douglas W. Cameron

(57) ABSTRACT

Briefly, according to the invention in an information processing system including a plurality of information processing nodes, a request for checkpointing by an application includes node health criteria (or parameters). The system has the authority to grant or deny the checkpointing request depending on the system health or availability. This scheme significantly improves not only the system performance, but also the application running time as the system. By skipping a checkpoint the application can use the same time to run the application instead of spending extra time for checkpointing.

8 Claims, 7 Drawing Sheets

METHOD AND SYSTEM FOR DECIDING WHEN TO CHECKPOINT AN APPLICATION BASED ON RISK ANALYSIS

FIELD OF THE INVENTION

The invention disclosed broadly relates to computer systems and single or multi-node data processing systems. More particularly, the invention is directed to a method to checkpoint applications in a computer system.

BACKGROUND OF THE INVENTION

Today computers, networks, or clusters of computers, are used for all types of applications. In order for these computers to be utilized efficiently and to their maximum capacity, it is important not only that the jobs scheduled for execution are scheduled efficiently, but also that the jobs be checkpointed judiciously in case that they are interrupted by computer failures to avoid rerunning them from scratch. A checkpoint is a copy of the computer's memory that is periodically saved on disk along with the current register settings. In the event of any failure, the last checkpoint serves as a recovery point. In long-running scientific applications, with runtimes of the order of weeks to months, checkpointing schemes are crucial for providing reliable performance. The checkpointing interval is a feature of the applications, not of the system. Presently, applications request checkpoints in a quasi-periodic manner, independent of the system health or availability. For computers with more than one node or multi-node systems, the checkpoint overhead increases linearly with the number of nodes.

Authors of long-running scientific applications typically use checkpointing to help recover from failures. However, it is often difficult or awkward to set the right checkpoint interval, because checkpointing depends on system parameters such as the mean time between failures. These failures may include hardware memory problems such as cache parity errors, or network problems such as failed communication between ports. Further, these failures are also time stamped. By considering the mean time between failures and other system parameters, checkpoints should be introduced in a way, such that they are appropriate for a particular system. Ideally, checkpoints should be placed wherever they are cheapest and fastest to perform, according to the determination of the application designer, and this placement should be made without regard for the particulars of the system.

As mentioned above, current checkpointing procedures for any type of computer or computer clusters are typically initiated by the long running applications. These checkpoints are requested by applications at times during their execution, when the application state is minimal, often between iterations of loops. Even if checkpointing methods are to minimize the loss of application running time due to system failures (which may be any type of hardware or software failure leading to the termination of the application), there is no link between the checkpointing interval, or when to checkpoint and system health or availability.

With current procedures for checkpointing, there is no knowledge about the behavior of the nodes when an application runs. Further, there is uncertainty as to whether a node will fail while an application is running, experiencing too many errors, or requiring a restart. Thus, without knowledge of the behavior of the nodes, more frequent checkpoints must be provided to account for any such failures or errors to avoid loss of application running time. For example, if a customer needs a specific application (such as protein folding) to be completed within a specified time, lack of knowledge of the behavior of the nodes forces the application developer to provide more frequent checkpoints to ensure that the application would be completed within a reasonable time, and the system has to accept these excessive checkpoint overheads. Therefore, there is a need to determine or forecast the behavior of nodes so that the system can make an intelligent decision on when to skip a checkpoint requested by the application.

A currently pending patent application Ser. No. 10/720,300, assigned to the same assignee as that of the instant application and incorporated herein by reference, discloses a failure prediction mechanism that determines the probability of the occurrence of failure of the nodes. This determination can be used to compare the probable node down time with the checkpoint overhead to decide whether to include a requested checkpoint or to skip it.

Referring to FIG. 1 we show a block diagram of a computer system 100 using a known checkpointing method. The computer system 100 comprises a plurality (in this case, six) of processing nodes (N1-N6) 105, wherein each node represents one or more processors. FIG. 1 also shows an operating environment 103 (i.e., the operating system, such as AIX or Windows), a health monitoring unit 104, partitions 110, and disk or storage system 102, as primarily affected by checkpointing. The health monitoring unit 104 is commonly known as a problem log unit, which receives information, for example, on failures such as those described above. Each partition can comprise a varying number of nodes according to the application requirements. Each partition is also known as an application running environment. Applications running in an application environment 110 decide the checkpointing interval (I) and are aware of the checkpointing overhead (C). Once the checkpointing time approaches, checkpointing is triggered by the applications from an application environment 110 and the instruction goes to operating environment 103 so that the operating environment 103 gives the instruction to start checkpointing or writing to disk or storage system 102.

Computer systems have one or more health monitoring units 104 for keeping a record or records of all the health-related information for all the nodes 105 as well as the operating environment 103. The health monitoring unit 104 also optionally includes a hardware diagnostics monitoring unit 106 providing health related information for all the hardware components. Known health monitoring units 104 do not have any direct interaction with the checkpointing or backing up mechanism with the hard disk or storage systems 102.

FIG. 2A is block diagram for known independent system software and hardware units within a computer system 200. This figure shows the different existing units with respect to checkpoint or backup mechanisms for computer systems.

A control environment 108 is the central control authority which receives health and diagnostic information from the health monitoring unit 104 and hardware diagnostic unit 106, respectively. The control environment 108 can also receive user specified information from other units 111.

FIG. 2B shows a simple flow diagram for a known checkpointing flow mechanism working independently from the health monitoring unit 104. The application environment 110 instructs the Operating environment 103 to start the checkpointing by writing the data to the disk or storage system 102 at the specified interval I and takes a checkpoint overhead of time C.

FIG. 2C is a flow diagram for the conventional system health monitoring unit 104 in case of a computer system. The health monitoring unit 104 is provided with the hardware diagnostics information from the hardware diagnostics unit 106. The hardware diagnostic information may include memory and communication problems described above. Similarly, the operating environment 103 provides all other software and other environmental health monitoring parameters, such as high temperature of hardware units, fan failures, or other conditions that are known to lead to system failures. Then, the diagnostic information and environmental health parameters communicated to the user through the control environment.

In conventional systems there is no connection between the health monitoring units and the checkpointing units without the human intervention or by means of a system administrator. Therefore there is a need for a system and method for checkpointing applications that uses a connection between the health monitoring units and the checkpointing units without the human intervention.

SUMMARY OF THE INVENTION

Briefly, according to the embodiment of the invention, an application makes a request for checkpointing including node health criteria (or parameters). The system has the authority to grant or deny the checkpointing request depending on the system health or availability. This scheme can significantly improve not only the system performance, but also the application running time as the system, based on its health or availability can either grant or deny the checkpointing process. By skipping a checkpoint the application can use the same time to run the application instead of spending extra time for possibly unnecessary checkpointing.

DESCRIPTION OF THE PREFERRED EMBODIMENT

Figure 1:
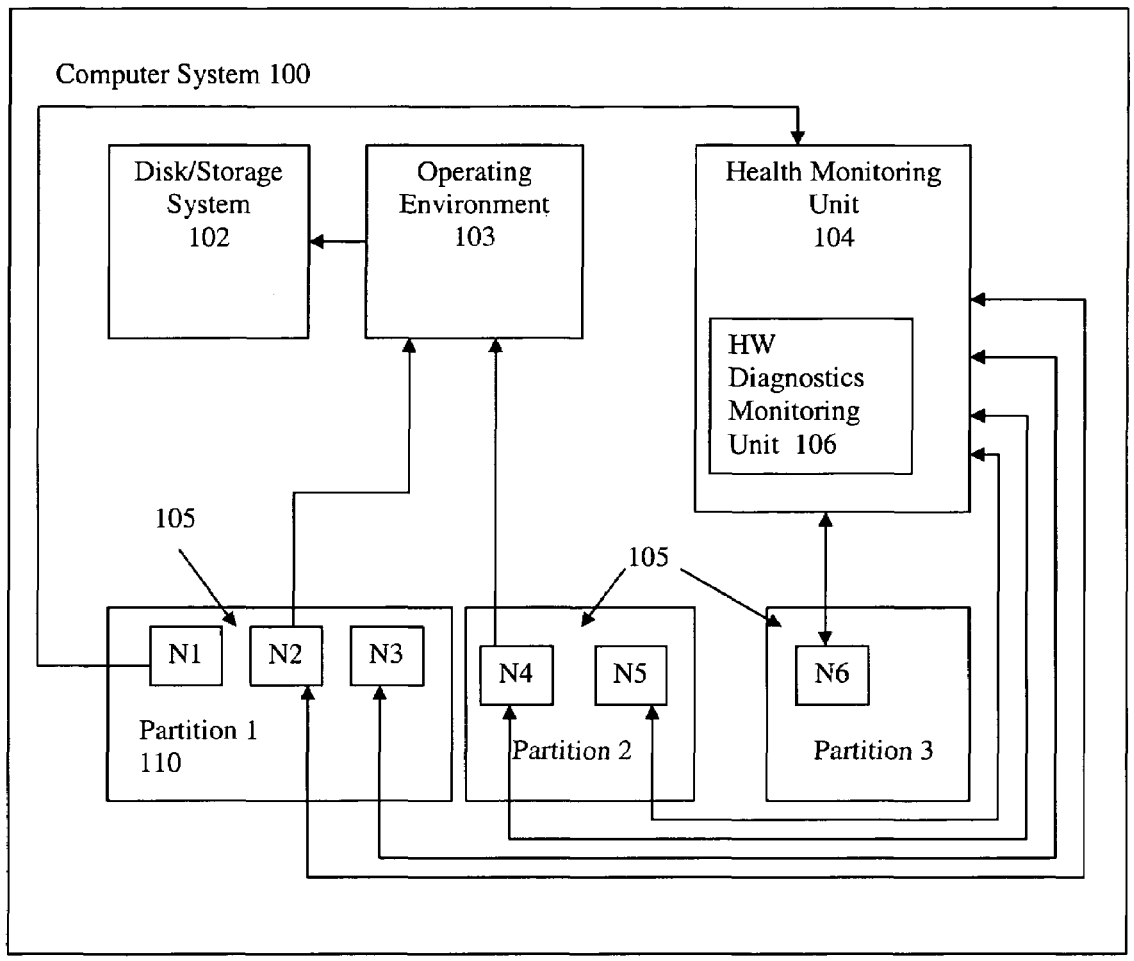
FIG. 1 is a flowchart of an existing checkpointing system.
Figure 3:
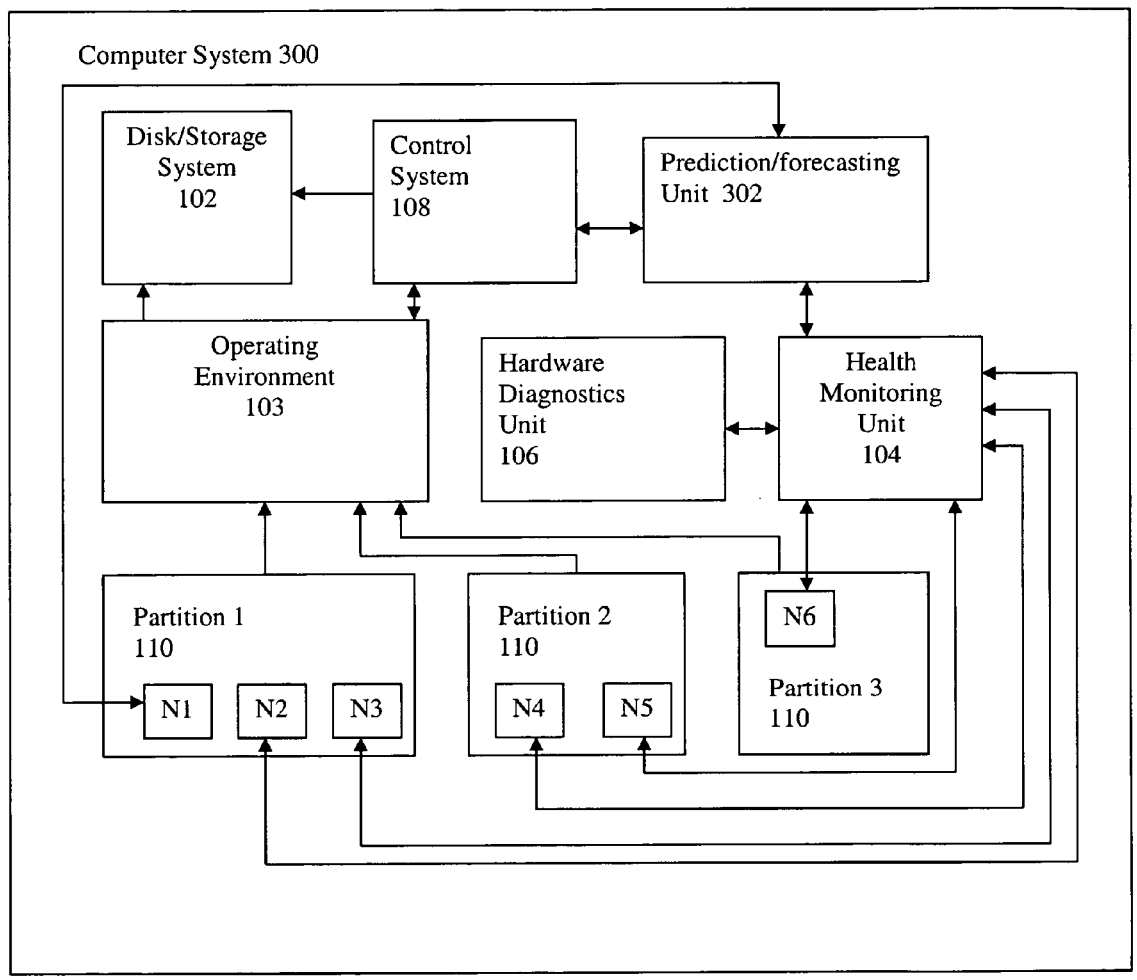
FIG. 3 illustrates a flowchart and working mechanism according to an embodiment of the invention.

According to an embodiment of the invention, in an information processing system comprising a plurality of processing nodes, a method automatically connects a checkpointing mechanism or mechanisms with the health monitoring environments so that an application can request checkpointing based on health-related parameters. FIG. 3 illustrates a system 300, according to the embodiment, of cooperative checkpointing so that the applications can request a checkpoint, which the system 300 may grant or deny. The system 300 is a modification of the existing system represented by FIGS. 1 and 3 with addition of a prediction or forecasting unit 302 as a new sub unit outside the operating environment 103 and inside the computer system 300. This unit collects the hardware related problems from hardware diagnostics unit 106 and software or other related problem information from operating environment 103. Unit 302 uses the prediction algorithms which are described in a co-pending application Ser. No. 10/720,300 filed on Nov. 24, 2003 and assigned to the same assignee (hereby incorporated by reference). These algorithms are used to calculate the failure prediction probability within a certain window of time. Thus, checkpoints should be placed liberally throughout the code, with the knowledge that the system will not allow them to lead to any degraded application or system performance. In other words, the system 300 acts on a cooperative basis to use a combination of: an application's knowledge when to checkpoint and the knowledge of the computer system when to deny a checkpoint. The present embodiment is directed to computer systems single or multi-node data processing systems. More particularly, the embodiment uses a method to checkpoint applications in a computer system, wherein the method comprises: calculating the node failure rates, error rates, other node related parameters affecting job or application running (for example: when a node A fails to communicate or report that it is alive the application dies due to the failure) and probability of occurrence of failure within a specified time window, finding out the last time when the application was checkpointed (i.e., how much time has transpired since the last checkpointing occurred), how long the application takes to be checkpointed and by means of calculating the expected loss of work (a product of the probability and the checkpoint interval) and the cost of checkpointing interval to decide whether to grant or deny a checkpointing.

Determining the probability of failure during a time window requires recognition of rare events. However, learning to recognize rare events is a difficult task. The difficulty may stem from several sources: few examples support the target class; events are described by categorical features that display uneven inter-arrival times; and time recordings only approximate the true arrival times, such as occurs in computer-network logs, transaction logs, speech signals, and the like.

In the present embodiment a prediction strategy for predicting rare or target events includes the following steps:

1. Finding all event types frequently preceding target events within a fixed time window;

2. Validating event types that uniquely characterize target events, and do not occur often far from the time arrival of target events; and 3. Combining validated event types to build a probabilistic rule-based system for prediction. See R. K. Sahoo, A. J. Oliner, M. Gupta, J. E. Moreira, A. Sivasubramaniam, R. Vilalta, "Cortical Event Prediction for Proactive Management in Large-Scale Computer Clusters" (Knowledge Discovery and Data Mining Conference, Wash., D.C., 2003, pp. 426-435).

When an application initiates a checkpoint at time "t" for a job, progress on that job is paused for the checkpoint overhead "C" after which the application may continue. The checkpoint latency "L" is defined such that job failure between times "t" and "t+L" will force the job to restart from the previous checkpoint, rather than the current one; failure after time "t+L" means the checkpoint was successful and the application can restart as though continuing execution from time t. There is also a \emph{checkpoint recovery} parameter "R" which is the time required for a job to restart from a checkpoint. "R" and "L" typically have an insignificant impact on checkpointing performance. Therefore, we treat "C" as approximately equal to L and R=0.

For large-scale systems these factors are prohibitive, and many designers permit application-initiated checkpointing only. Most scientific applications tend to be running many times, and the machines are largely homogeneous. As a result, there is a high degree of predictability. When we assume knowledge of the checkpoint interval "I", for example, this information could be learned through application profiling, or from information provided directly to the system by the job. Similarly, checkpoint overhead "C" can often be estimated from a number of factors, such as the cost of the previous checkpoint for that job or the upper bound for the system. Despite such efforts to reduce checkpoint overhead, these costs continue to increase with the size of the machine, and are heavily dependent on system conditions like network traffic and disk activity.

Let $s_{(i-1)}$ be the time to which progress would be rolled back in the event of a failure. This may be either the start of the most recently-completed checkpoint or the time at which the application was first called. Let $s_i$ be the time at which application j requests a checkpoint i, for 1 greater than or equal to 1, and let $f_i$ be the time at which checkpoint i is completed. Let $s_{(i-1)}$ be the time at which the next checkpoint will be started. Since checkpoints often occur at regular intervals, this value is relatively predictable. To simplify our analysis, we define I to be the checkpoint interval such that for all $I=f_{(i-1)}-s_i$ for all I greater or equal to 1, unless checkpoint (i-1) is skipped, in which case the interval is $dI=f_{(i-d)}-s_i$, where i-d is the last checkpoint that was performed. Let $C_i$ be the checkpoint overhead for checkpoint I of job j under the system conditions at time $s_i$. Note that $C_i=f_j-s_i$, or 0 if the checkpoint is skipped. For a typical system, it is possible to predict C, as well as I, with relative accuracy by drawing on system-level performance guarantees and prior application behavior. Job j runs on $n_j$ nodes. We define a unit of work to be a node-second, so occupying n nodes for k seconds consumes work (n×k).

A more realistic measure of predictability is expectation: how much work do we expect to lose before checkpoint i+1 is completed? If that measure is greater than the cost of checkpointing, then we perform the checkpoint. Let $p_f$ be the probability that the partition on which job j is running will fail before $f_{(i+1)}$. Using the same measure as above, the expected cost of skipping the checkpoint is $p_f(d+1)I+C_{(i+1)}$ with no cost if a failure does not occur. The cost of performing the checkpoint is $p_f(I+C_{(i+1)}+C_i)+(1-p_f)C_i$. Using $C_{(i+1)}$ as approximately equal to $C_i$, this reduces to the heuristic for checkpointing to the following equations:

$$P_f((d+1)I+C_i) \geq p_f(I+2C_i)+(1-p_f)C_i$$

$$p_f dIp\_f \geq C_i+(1-p_f)C_i$$

$$P_f dI \geq C_{i\_}I$$

As an example of the use of the checkpointing method discussed herein consider a worst case scenario, where $p_f$ is 1. Because checkpoints can be initiated only by the application, this choice is the only opportunity for the system to exert its influence over the checkpointing strategy. The system must answer the question expressed by the equation above which compares the cost of performing the checkpoint with the risk associated with skipping the checkpoint. If the inequality holds (i.e. the risk exceeds the cost), the checkpoint should be performed. In this way, the system cooperates with the application to select a mutually agreeable checkpointing strategy.

The inequality is calculated by considering the worst-case failure scenario, in which a failure would occur just before the successful completion of checkpoint i+1. We consider the amount of time by which the successful completion of checkpoint i+1 would be delayed from the scenario in which no checkpoint is performed, and no failure occurs. That is, we measure the delay beyond $I+C_{(i+1)}$. For example, if we skip checkpoint i, then after paying $I+C_{(i+1)}$ and failing, we would roll back to $f_{(i-d)}$ (where (i-d) is the last checkpoint that was performed), pay dI to return to where we were, and then pay another $I+C_{(i+1)}$ to finish the checkpoint. On the other hand, performing the checkpoint would mean that we only roll back to $f_i$. Performing the checkpoint already delayed progress by $C_i$, but to finish checkpoint i+1, it is only necessary to pay another $I+C_{(i+1)}$. So we perform the checkpoint if:

$$n_j \times ((d+1)I+C_{(i+1)}) \geq n_j \times (I+C_{(i+1)}+C_i$$

$$dI \geq C_i$$

Note that dI in the equation above represents the time since the last completed checkpoint. This is merely the static checkpoint interval. Consequently, also note that it is possible to have checkpoints which can be skipped with some regularity. For example, if the interval between two consecutive checkpoints is $I_1<C$, the checkpoint will be skipped. If, however, $2I_1>C>I_1$, then precisely every other checkpoint will be performed.

Referring again to FIG. 3, once the prediction unit 302 provides information about the probability (p) of failure for any desired node or its component, the same information along with the checkpointing interval (I) (for jobs running on the same node(s) or partition) is used to calculate (p×I). Similarly, the checkpointing overhead (c) can be estimated for the same job by comparing or tabulating the previous checkpointing overheads for the same job recorded earlier.

If (p×I)≧C, checkpointing is continued; however, if (p×I) <C then checkpointing is skipped. By skipping a checkpointing we take a risk. However, if P×I is greater than C, then the work loss due to any problem would be more than the amount of time needed to checkpoint. Hence, we should go for checkpointing in those cases.

In the worst case, we might consider p=1. In that case the logic will be dependent on I>C. This would result to address the worst possible case related to risk.

Figure 2A:
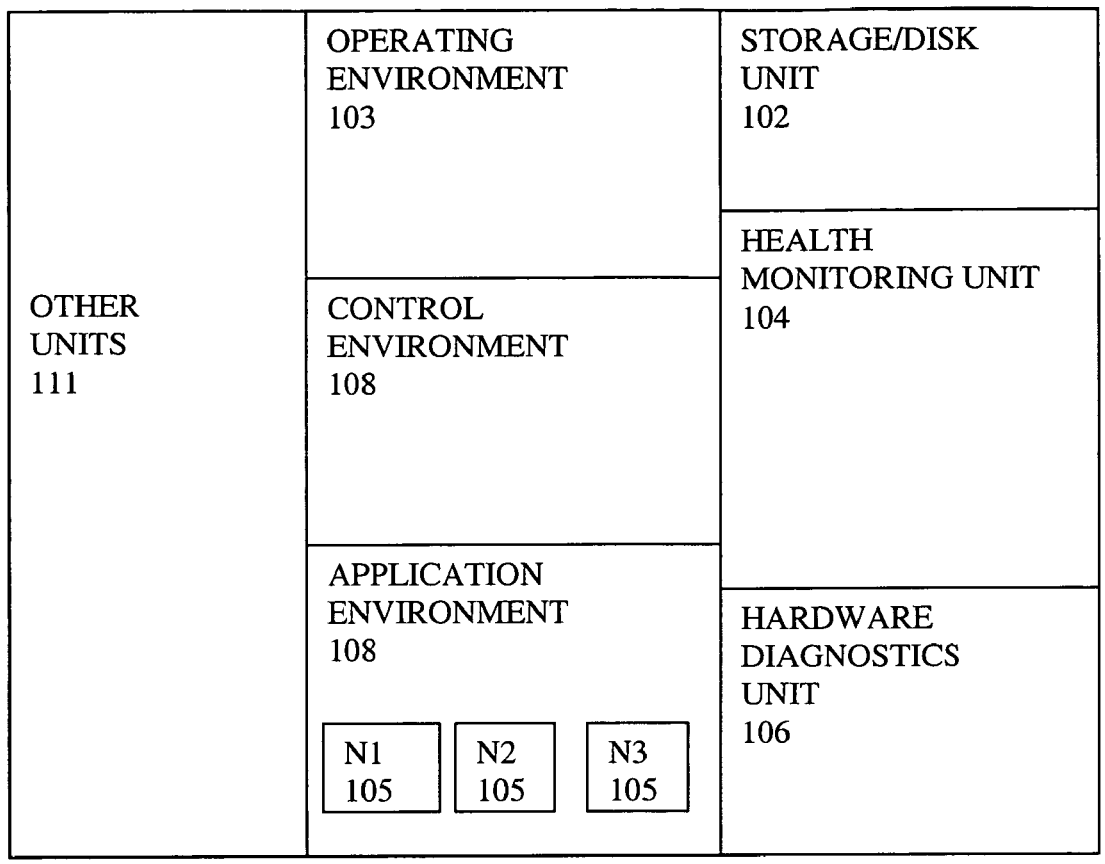
FIGS. 2A-C, are block diagrams of system-based components and flow charts for an existing method used in the prior art.
Figure 2B:
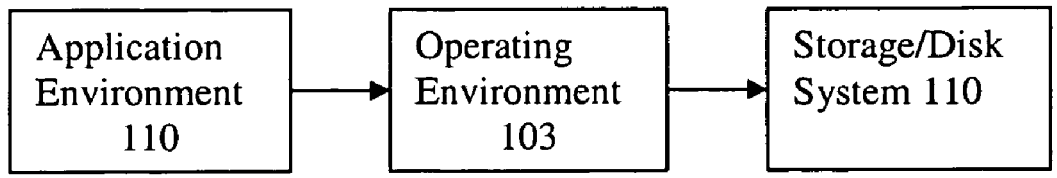
Figure 2C:
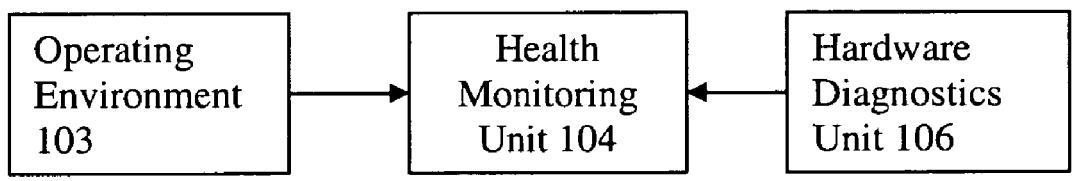
Figure 4A:
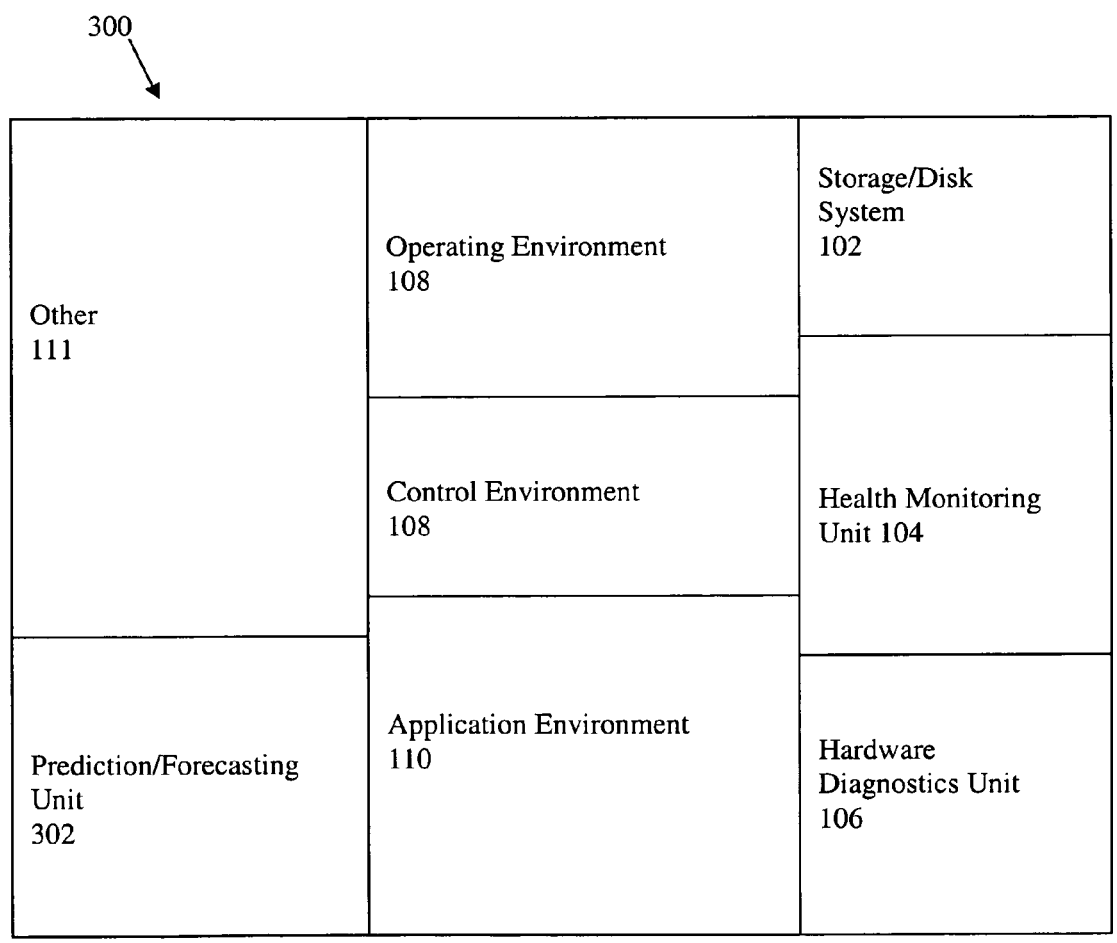
FIGS. 4a and 4b illustrate system-based components in place of existing components in existing methods (as in FIG. 2).

FIG. 4A is a block diagram illustrating a method according to an embodiment of the invention. Here we have added the prediction/forecasting unit 302 to the system explained in FIG. 2A.

Figure 4B:
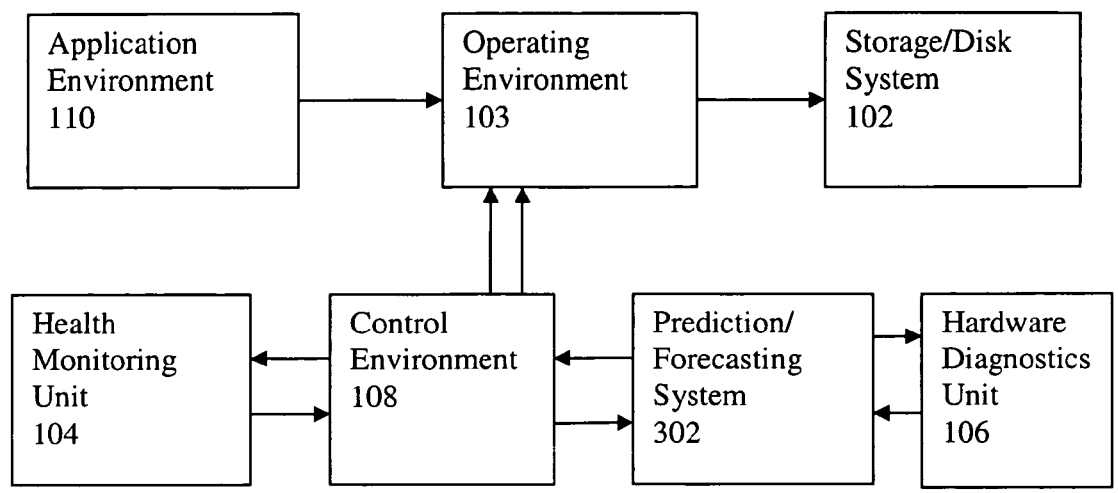

FIG. 4B is a flow diagram for the logic linking the checkpointing mechanism with the health monitoring unit 104. Here the health monitoring unit 104 works hand-in-hand with the prediction/forecasting unit 302 and the hardware diagnostics unit 106 as well as the operating environment 103. The control environment informs the operating environment 103 on the probability of failure (p), while the application environment provides the checkpointing interval (I) and checkpointing overhead (C).

Figure 5:
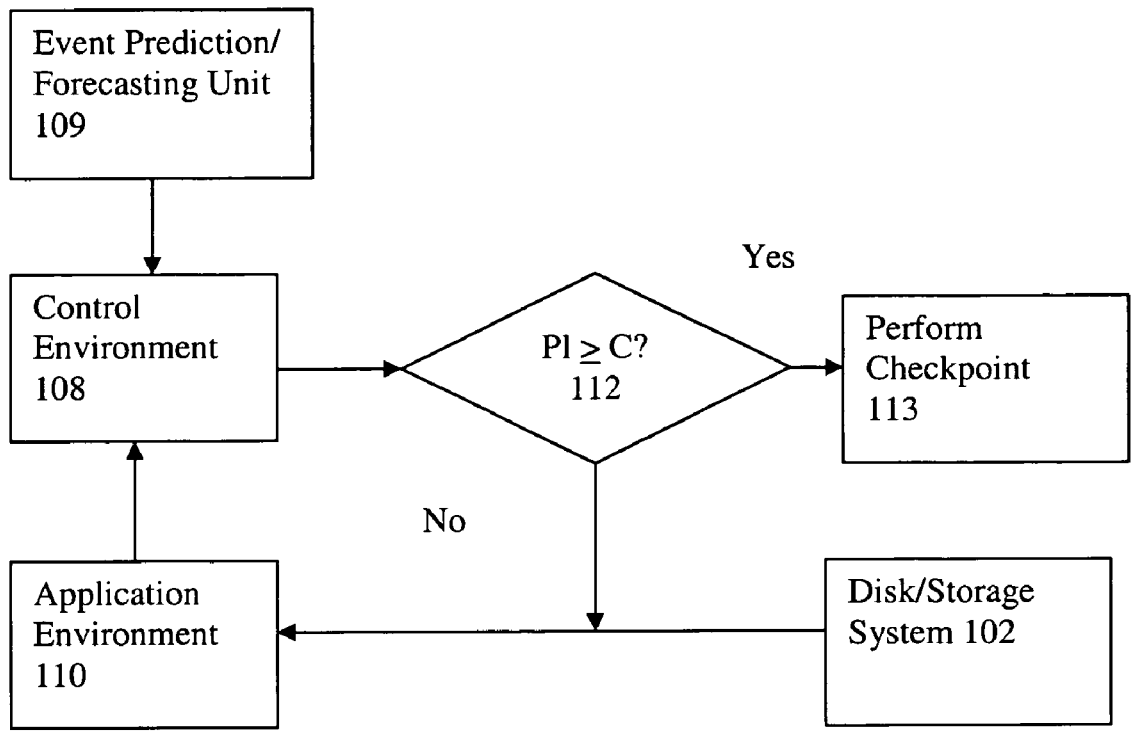
FIG. 5 describes the overall working method for an embodiment of the invention.

FIG. 5 is a flow chart illustrating the logic flow for the checkpointing and health monitoring system 300 of FIG. 3. The control environment 108 receives all the application related parameters p from the Event Prediction Unit 202 and, I and C from the Application Environment 110. As discussed above, based on the comparison of pI and C, the control environment decides whether to go for the checkpointing or not and then go back to the application to continue running. As described above, if checkpointing is to be carried out, application data is written to the disk/storage system 102. If not, the application continues to run in the application environment 110 without performing checkpointing.

Therefore, while there has been described what is presently considered to be the preferred embodiment, it will be understood by those skilled in the art that other modifications can be made within the spirit of the invention.

We claim:

1. In a multi-node information processing system, a method for checkpointing an application comprising steps of:

receiving from an application a request for checkpointing, wherein the request includes node health-related parameters;

determining whether to grant the checkpointing request, based on node health parameters;

determining a last time when the application was checkpointed; and determining how long the application takes to be checkpointed.

2. The method of claim 1 wherein the health-related parameters comprise node failure rates.

3. The method of claim 1 wherein the health-related parameters comprise error rates.

4. The method of claim 1 wherein determining whether to grant the checkpointing request comprises determining a probability of occurrence of a failure within a specified time window.

5. The method of claim 1 wherein the request for checkpointing comprises the node health-related parameters.

6. The method of claim 1, wherein determining whether to grant or deny the checkpoint request comprises calculating an expected loss of work and a cost of checkpointing interval.

7. The method of claim 1 further comprising determining a set of node health-related parameters affecting a job or an application running in the system before receiving the request for check pointing.

8. In a multi-node information processing system, a method for checkpointing an application comprising steps of:

receiving from an application a request for checkpointing, wherein the request includes node health-related parameters;

determining a risk associated with shipping a checkpoint associated with the application;

comparing a cost of checkpointing with the risk of shipping the checkpoint;

granting the request for checkpointing if the risk exceeds the cost.

* * * * *